L. T. JENSEN.
SPEED INDICATOR.
APPLICATION FILED MAR. 18, 1914.

1,125,333.

Patented Jan. 19, 1915.

Witnesses.
A. H. Opsahl.
Emily May King.

Inventor.
Louis T. Jensen
By his Attorneys
Williamson & Merchant

UNITED STATES PATENT OFFICE.

LOUIS T. JENSEN, OF MINNEAPOLIS, MINNESOTA.

SPEED-INDICATOR.

1,125,333. Specification of Letters Patent. Patented Jan. 19, 1915.

Application filed March 18, 1914. Serial No. 825,553.

*To all whom it may concern:*

Be it known that I, LOUIS T. JENSEN, a citizen of the United States, residing at Minneapolis, in the county of Hennepin and State of Minnesota, have invented certain new and useful Improvements in Speed-Indicators; and I do hereby declare the following to be a full, clear, and exact description of the invention, such as will enable others skilled in the art to which it appertains to make and use the same.

My present invention relates to speed indicators, and in some respects, is in the nature of an improvement on the speed indicator disclosed and claimed in my pending application 799,321, filed of date, November 5th, 1913, and in other respects, the present invention involves features capable of much wider range of application in speed indicators.

In the accompanying drawings which illustrate the invention, like characters indicate like parts throughout the several views.

Figure 1:
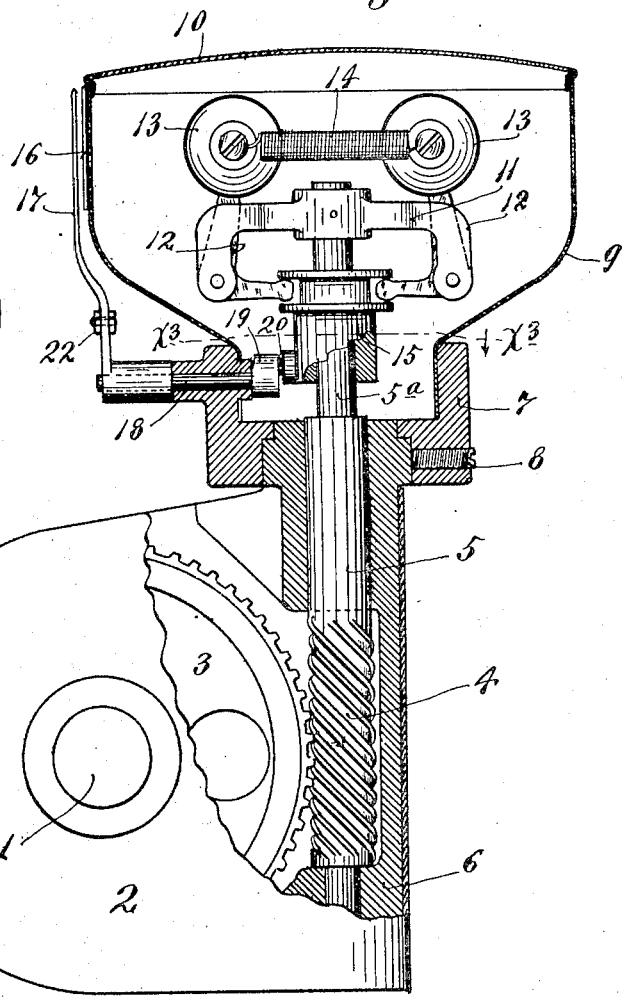
Figure 3:
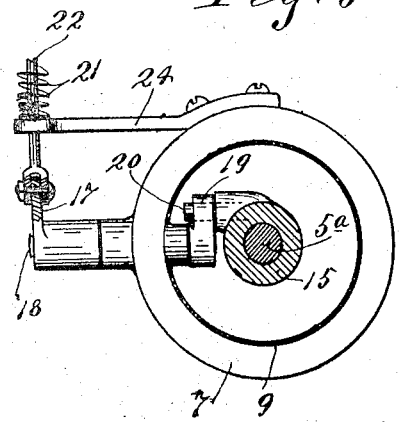
Figure 2:
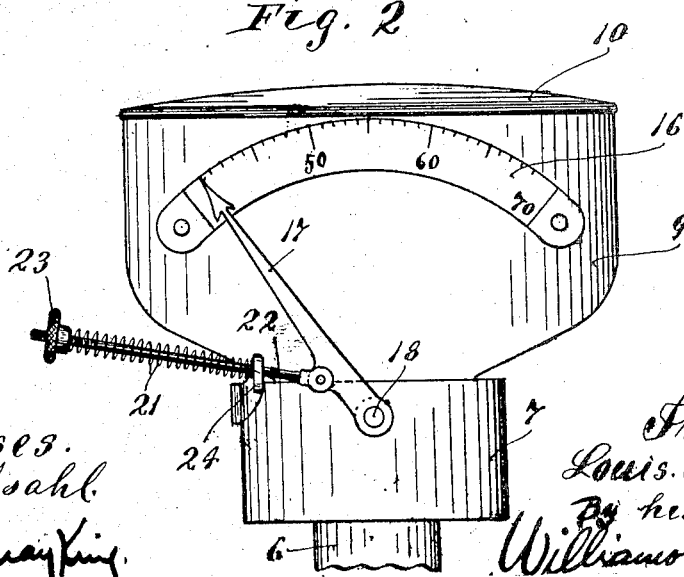

Referring to the drawings: Figure 1 is a view partly in side elevation and partly in vertical section showing the improved speed indicator; Fig. 2 is a front elevation of the indicator, some parts being broken away; and Fig. 3 is a horizontal section taken on the line $x^3$ $x^3$ on Fig. 1.

The crank shaft of the driving mechanism of the cream separator, or similar machine, is indicated by the numeral 1. This crank shaft 1 may be assumed to be driven by hand power through a suitable crank, not shown, such for example, as usually provided in cream separators. The said crank is journaled in suitable bearings of a casing 2 which may be suitably secured to the frame of the cream separator. In the arrangement illustrated, the crank shaft 1 carries a worm gear 3 that meshes with a worm 4 of an upright spindle 5, that is journaled in suitable bearings afforded by a sleeve-like portion 6 of the casing 2. An annular bearing head 7 is swiveled on the upwardly extended end of the sleeve-like bearing 6, and is adapted to be held in any desired position by a set screw 8. As shown, the head 7 carries a centrifugal governor and a casing 9 having a cover 10. The upper end of the spindle 5 is reduced at $5^a$, and to the upper end of its reduced portion is secured a transversely extended head 11, to the ends of which, bell crank levers 12 are pivotally attached at their elbows, and, to the upper arms of the bell cranks 12, fly balls 13 are attached, and these fly balls are connected by a so-called primary coiled spring or springs 14, which springs tend to draw the fly balls toward each other. The inwardly extended lower arms of the bell cranks 12, work in a peripheral groove of a sleeve or collar 15 that is loosely mounted on the reduced portion $5^a$ of the spindle 5 with freedom for rotation of the said spindle, in respect to the said sleeve and with freedom for sliding movement of the said sleeve on the said spindle.

Secured on the governor casing or housing 9 is a graduated segmental dial 16. A pointer 17 coöperates with the dial, and this pointer is secured to the outer end of a short rock shaft 18 journaled in the bearing head 7 and projecting inward toward the reduced end of the spindle 5. To the inner end of the rock shaft 18 is secured a short arm 19 provided at its free end with an eye or perforation that is engaged by a short rod or finger 20, secured to the governor actuated sleeve 15 and projecting outward therefrom. The dial 16 should, of course, be properly graduated to indicate within a certain limit, the number of rotations of the driving shaft 1. When the spindle 5 is rotated and the governor is thrown into action, the engagement between the rod 20 and arm 19 holds the sleeve 15 against rotation, but with freedom for axial or sliding movements on the reduced end of the spindle 5, and at such times, the inwardly extended arms of the bell cranks 12 move within the groove of the said sleeve and control its sliding movements.

To set the governor for accurate speed indication requires a nice adjustment of the springs which tend to throw the fly balls 13 radially inward, or toward each other. The adjustment of the springs 14 is not an easy matter at any time, and is impossible while the governor is in action, and obviously, the adjustment of the indicator should be made while the governor is in action. For this reason, I provide an adjustable auxiliary spring for working in conjunction with the so-called primary spring or springs 14. This auxiliary spring is preferably a relatively light coiled spring 21 applied to the pointer 17, at the outside of the governor casing where it is accessible, and connected to the said pointer by means of a rod 22 having a spring adjusting nut 23. One end of this rod 22 is pivotally attached to the pointer 17 and the said rod works loosely through a perforation in an arm 24 that is rigidly secured to and projects from the bearing head 7. The spring 21 is compressed between the said arm and the nut 23. Evidently, with this arrangement, the tension of the auxiliary spring 21 may be varied at will while the governor is in action. It is also important to note that both elements of the speed indicator, to-wit, the dial and coöperating pointer, and the connections between the pointer and the sleeve 15, are all mounted on a common support, to-wit, as shown, on the bearing head 7, or the extended casing 9 thereof. With this construction, it follows that the dial and pointer may be turned or oscillated horizontally into any desired position without in any way changing the relative adjustment of the governor, and for that matter, without requiring the governor to be thrown out of action. This adjustment of all of the parts of the governor as an entirety, is important for several reasons, among the most important of which it may be mentioned the fact that in applying the governor to different cream separators or analogous machines, adjustments of the position of the indicator to different positions will be required.

What I claim is:

1. In a speed indicator, the combination with a rotary spindle and a centrifugal governor driven thereby, said governor including a main spring incorporated therein, of indicating means comprising a coöperating dial and a pointer, the one member of said means having a movement in respect to the other, and the movable member being subject to said centrifugal governor, and an auxiliary spring tension device, operative on the said movable member and reinforcing the action of said main spring of the governor, and itself having a screw-threaded tension-adjusting element, arranged to be engaged and operated while the governor is in action.

2. In a speed indicator, the combination with a rotary spindle, and a centrifugal governor carried thereby, said governor comprising levers and fly balls and a spring for holding said fly balls inward against the action of centrifugal force, of a bearing head mounted for rotary adjustments around said spindle and provided with a casing inclosing said governor, a dial supported by and at the exterior of said casing, a pointer coöperating with said dial and having a shaft journaled in said bearing head and extended inward and provided with an arm at its inner end, and a sleeve loosely mounted on said spindle and connected to the said arm for oscillating said pointer, said sleeve having a peripheral groove in which the inner ends of the fly ball arms are engaged.

3. In a speed indicator, the combination with a rotary spindle, and a centrifugal governor carried thereby, said governor comprising levers and fly balls and a main spring for holding said fly balls inward against the action of centrifugal force, of a bearing head mounted for rotary adjustments around said spindle and provided with a casing inclosing governor, a dial supported by and at the exterior of said casing, a pointer coöperating with said dial and having a shaft journaled in said bearing head and extended inward and provided with arms at its inner end, and a sleeve loosely mounted on said spindle and connected to the said arms for oscillating said pointer, said sleeve having a peripheral groove in which the inner ends of the fly ball arms are engaged, and an adjustable auxiliary spring anchored to the exterior of said casing and connected to said pointer.

In testimony whereof I affix my signature in presence of two witnesses.

LOUIS T. JENSEN.

Witnesses:
EVA E. KÖNIG,
HARRY D. KILGORE.